(12) United States Patent
Jhou (10) Patent No.: US 9,227,469 B2
(45) Date of Patent: Jan. 5, 2016

(54) AIR COMPRESSOR HAVING INFLATING AND AEROSOL SPRAYING FUNCTIONS FOR TIRES

(71) Applicant: Wen-San Jhou, Tainan (TW)

(72) Inventor: Wen-San Jhou, Tainan (TW)

( * ) Notice: Subject to any disclaimer, the term of this patent is extended or adjusted under 35 U.S.C. 154(b) by 374 days.

(21) Appl. No.: 13/845,549

(22) Filed: Mar. 18, 2013

(65) Prior Publication Data

US 2014/0261878 A1  Sep. 18, 2014

(51) Int. Cl.
*B60C 23/00* (2006.01)
*B29C 73/16* (2006.01)

(52) U.S. Cl.
CPC .............. *B60C 23/00* (2013.01); *B29C 73/163* (2013.01); *B29C 73/166* (2013.01)

(58) Field of Classification Search
CPC ...... B29C 73/163; B29C 73/166; B60C 23/00
USPC .................................................. 141/38, 104
See application file for complete search history.

(56) References Cited

U.S. PATENT DOCUMENTS

| 4,648,431 | A  | * | 3/1987 | Strongert et al. ............... 141/18 |
| 4,765,367 | A  | * | 8/1988 | Scott .............................. 137/607 |
| 6,786,247 | B1 | * | 9/2004 | Kemppainen et al. .......... 141/84 |
| 7,562,671 | B2 | * | 7/2009 | Wang ............................. 137/231 |
| 8,201,586 | B2 | * | 6/2012 | Yoshida et al. ................. 141/38 |
| 8,226,377 | B2 | * | 7/2012 | Yoshida et al. ............... 417/151 |
| 8,297,321 | B2 | * | 10/2012 | Chou ............................. 141/38 |

* cited by examiner

*Primary Examiner* — Timothy L Maust (57) ABSTRACT

The present invention provides an air compressor having inflating and aerosol spraying functions for tires. The air compressor has an innovative actuator with an eccentric cam so that the present invention can not only perform singly inflating function for the flat tire but also perform fixing function for the rupture tire. The present invention comprises a case containing an air compressor and a tire fixing aerosol containing chemical sol therein with an actuator, which enables the present invention to shift the operation of the air compressor and tire fixing aerosol between the singly inflating and fixing functions for tire with easy manipulation.

5 Claims, 6 Drawing Sheets

AIR COMPRESSOR HAVING INFLATING AND AEROSOL SPRAYING FUNCTIONS FOR TIRES

BACKGROUND OF THE INVENTION

1. Field of the Invention

The present invention provides an air compressor for inflating a tire and spraying aerosol spraying onto tires, including an actuator with an eccentric cam for switching between the two different functions of inflating and aerosol spraying.

2. Description of the Prior Art

The essential structure of a conventional tire fixing aerosol comprises a cover, a canister and an inner dip tube, wherein the canister is filled with chemical sol therein for urgently fixing a ruptured tire temporarily; the cover usually includes two manifolds such that one manifold is used to connect with a compressed air output from an air compressor while the other manifold is used to connect with a chemical sol muzzle from the canister; and the inner dip tube, which is linked to the cover, is disposed inside of the canister when the cover is engaged with the cover. Currently, most conventional apparatus for fixing a ruptured tire temporarily in an urgent situation include a separate tire fixing aerosol with two manifolds together with a case containing an air compressor therein, which is to supply compressed air to the tire fixing aerosol. In practical operation of fixing a ruptured tire, a user can connect the first manifold of the tire fixing aerosol to a compressed air output from the case while connect the other second manifold of the tire fixing aerosol to the nozzle of the ruptured tire. Then, the user starts the air compressor to initiate the propellant of the chemical sol forced out of the canister into the ruptured tire for accomplishing the tire sealing and fixing temporarily. However, the conventional design of tire fixing aerosol with a case, which is limited in used for fixing a ruptured tire, can-not be used in inflating a flat tire. Having realized and addressed forgoing drawbacks of the conventional tire fixing aerosol, the inventor of the present invention contrives an innovative actuator with an eccentric cam to switch between two manifolds of tire fixing aerosol so as to independently perform inflating function for flat tires and aerosol spraying function for ruptured tires.

SUMMARY OF THE INVENTION

The primary object of the present invention is to provide an air compressor for inflating and aerosol spraying for tires, which comprises a case containing an air compressor and a tire fixing aerosol containing chemical sol therein with an actuator, which enables the air compressor to switch conveniently between the operation of the air compressor and the tire fixing aerosol for tires. In order to achieve above object, the present invention offer a solution as below. An air compressor having the functions of inflating and aerosol spraying for tires comprises a case containing an air compressor and a tire fixing aerosol containing chemical sol therein with an actuator, wherein said air compressor serves to supply compressed air; said tire fixing aerosol includes a first manifold and a second manifold, and the first manifold receives the compressed air from the air compressor while the second manifold supplies the chemical sol coming out from the tire fixing aerosol. The tire fixing aerosol basically comprises a canister, a cover, an actuator and a dip tube with deformed upper tubular section, wherein the canister, which is a hollow container, includes a neck opening, a canister arcuate bottom and a holding chamber for containing chemical sol therein. The cover, which is engaged with the canister 2 by thread-screwing, further includes an upper annular gap, a lower annular gap, a plurality of equally spaced vertical through troughs formed on the surrounding wall of the lower round cylinder, and a bottom flange formed at the bottom of the lower round cylinder to define a round hole in communication with an internal circulating chamber of the lower round cylinder. The cover further includes an aperture on the top end thereof with a pair of opposed through slots and a pair of opposed axle holes, wherein each through slot is formed with its top opening and its bottom closed, and the pair of axle holes are located between the pair of through slots. The upper round cylinder includes a first manifold and a second manifold to communicate with the internal circulating chamber. The cover further includes a spring, which is inserted form the aperture of the upper round cylinder and positioned on the bottom flange in the internal circulating chamber of the lower round cylinder. The dip tube of a suitable length includes a tubular inner-space, a swollen top collar section with a top end closed, a sealing O-ring disposed on the top collar section, and a tube lower section. The dip tube further includes a middle notched upper flange with a sealing O-ring wrapping on the middle notch thereof, a middle notched lower flange with a sealing O-ring wrapping on the middle notch thereof and a first annular neck groove with a tube through hole disposed between the middle notched upper flange and middle notched lower flange such that the tube through hole runs through the dip tube at the first annular neck groove in communication therewith. The dip tube further includes a second annular neck groove formed between the middle notched upper flange and middle notched lower flange. The actuator is engaged with a pair of axle holes to allow the actuator pivot around so that the displacement of the dip tube is changeable. The actuator includes an eccentric cam with a pair of camshafts on both sides thereof, and a lever ring on the other end of the actuator, wherein the pair of camshafts are engaged with the pair of axle holes to allow the actuator pivot around, and the camshaft serves as a pivotal center of the lever ring while the eccentric cam may be located on the aperture of the upper round cylinder to contact against the top closed end of the dip tube. The pair of through slots of the upwards round cylinder allow the actuator to swing in a semicircle for changing operation mode. The case further comprises a first compartment, a second compartment and a third compartment, wherein the first compartment includes a plurality of septa such that the air compressor and manometer can be respectively partitioned by each septum. One end of a first transmitting hose is connected to the discharging manifold of the air compressor while the other end thereof is connected to the first manifold of the tire fixing aerosol; one end of an exposed second transmitting hose is connected to the second manifold of the tire fixing aerosol while the other end thereof is connected to the nozzle of the rupture tire; one end of a third transmitting hose is connected to the discharging manifold of the air compressor while the other end thereof is connected to the manometer.

With foregoing structure, the air compressor of the present invention can be operated to inflate for the flat tires but also to fix the ruptured tires. Regarding the specific structure and the practical functions, detailed description is manifested in the following preferred exemplary embodiments in association with accompanying drawings.

DESCRIPTION OF THE PREFERRED EMBODIMENTS

Figure 1:
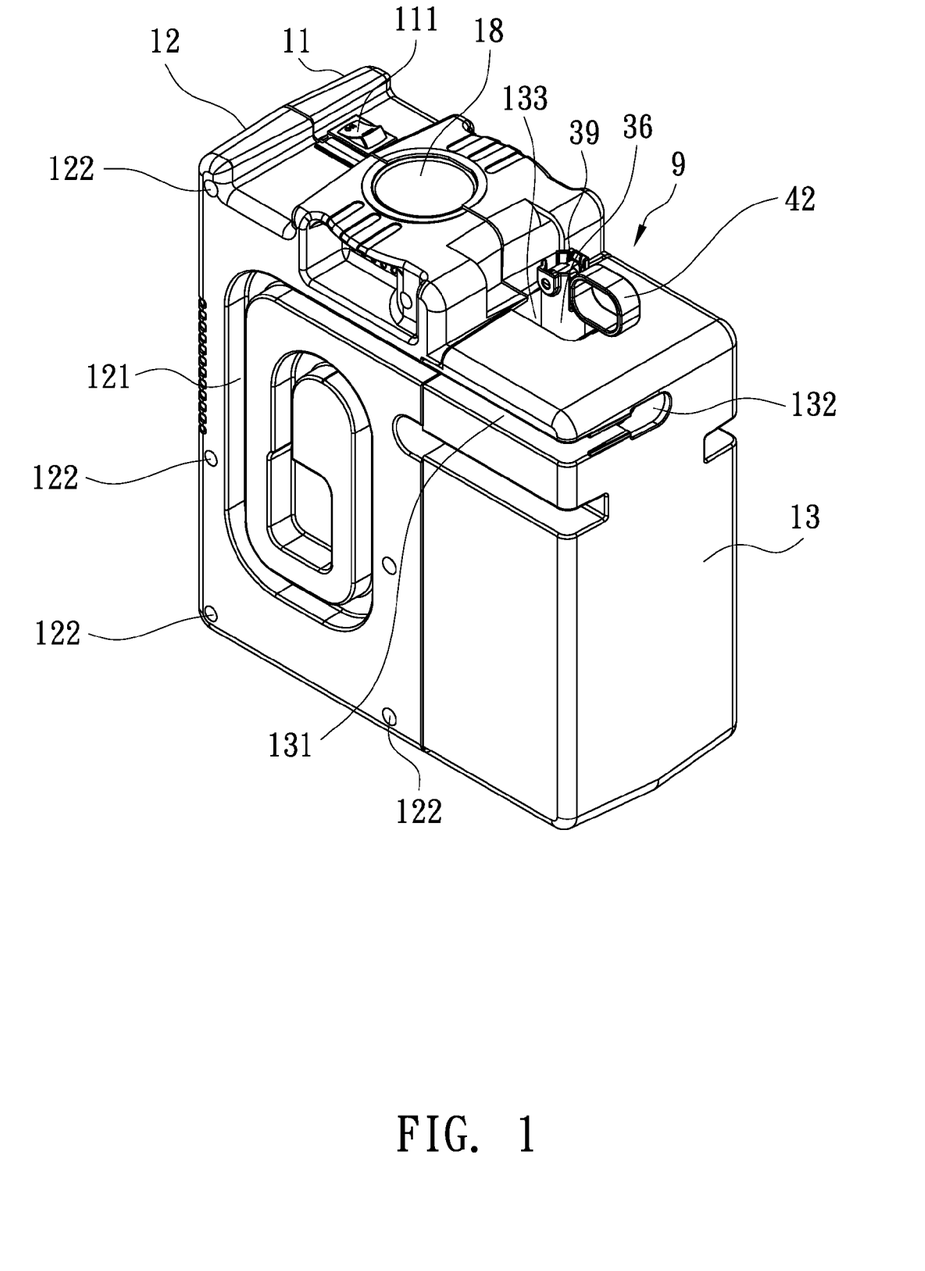
FIG. 1 is a perspective schematic view showing an air compressor together with a tire fixing aerosol having inflating and aerosol spraying functions for tires of the present invention.
Figure 2:
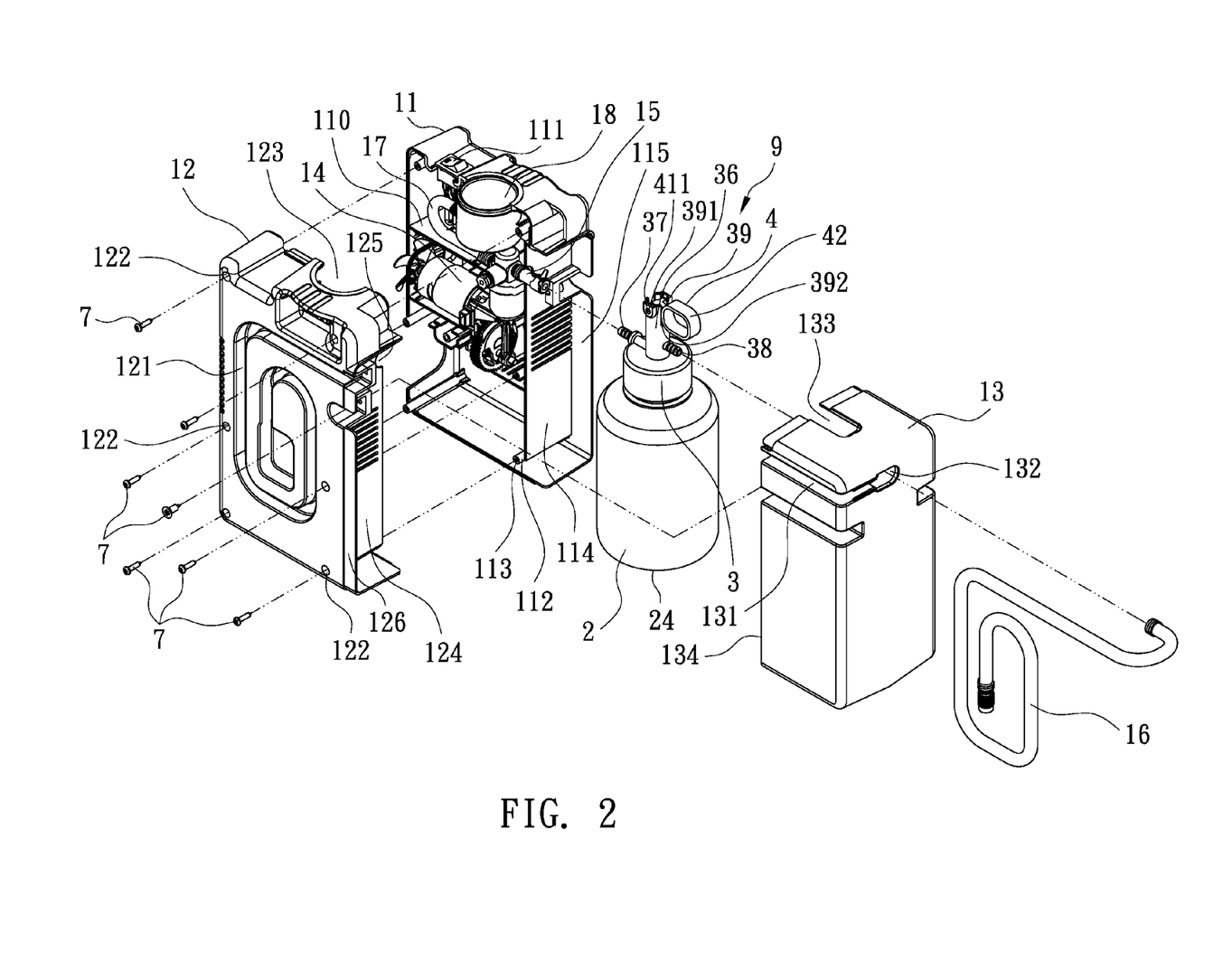
FIG. 2 is an exploded schematic view showing an air compressor together with a tire fixing aerosol having inflating and aerosol spraying functions for tires of the present invention.

In order to further disclose the technological means of the present invention, some preferred exemplary embodiments are detailed described as following in association with accompanying drawings. Please refer to FIGS. 1 and 2, which show an air compressor together with a tire fixing aerosol having the two different functions of inflating and aerosol spraying for tires of the present invention. The air compressor and tire fixing aerosol here, which are denoted with referential numerals as air compressor 14 and tire fixing aerosol 9, comprises a pressure gauge or manometer 18, a case in combination of first compartment 11, second compartment 12 and third compartment 13, as well as a concealed first transmitting hose 15, an exposed second transmitting hose 16 and a concealed third transmitting hose 17, wherein:

The first compartment 11 includes a plurality of septa 110, a switch 111 and a plurality of engagement shafts 112 with each engagement bore 113 therein such that the air compressor 14 and manometer 18 can be respectively partitioned by each septum 110; the switch 111 is disposed at the top surface of the first compartment 11 to start and stop operation of the air compressor 14;

The second compartment 12, which is combined with the first compartment 11 by running a plurality of locking elements 7 through a plurality of through bores 122 thereon and corresponding engagement bores 113 in the engagement shafts 112 of the first compartment 11, includes a serpent-curled internal recess 121 in front panel, a semicircular punched hole 123 for accommodating the manometer 18 in an exposed manner, and a lateral panel 124 with a protrude panel 126 vertically extended from abutting edge to match with corresponding lateral panel 114 with a protrude panel 115 in the first compartment 11;

The third compartment 13 includes an encompassed space 130, an internal recess 131 with a punched hole 132, a cut-out 133 created on the top surface thereof, and a pair of latches 134 formed on both side walls for engagement with the protrude panels 115, 126 on the first compartment 11 and second compartment 12 respectively.

The tire fixing aerosol 9 is firmly disposed in the encompassed space 130 of the third compartment 13 in contact with the lateral panels 114, 124 on the first compartment 11 and second compartment 12 respectively without possibility of tilting or tumbling; One end of the first transmitting hose 15 is connected to the discharging manifold 141 of the air compressor 14 while the other end thereof is connected to the first manifold 37 of the tire fixing aerosol 9; one end of the second transmitting hose 16 is connected to the second manifold 38 of the tire fixing aerosol 9 while the other end thereof is connected to the nozzle of the rupture tire (not shown in figures); one end of the third transmitting hose 17 is connected to the discharging manifold 142 of the air compressor 14 while the other end thereof is connected to the manometer 18; When the switch 111 is toggled in, the compressed air is pumped into the rupture tire orderly via first transmitting hose 15, inside of the tire fixing aerosol 9 and second transmitting hose 16 for injecting chemical sol 23 into the rupture tire for fixing and inflating the tire.

Figure 3:
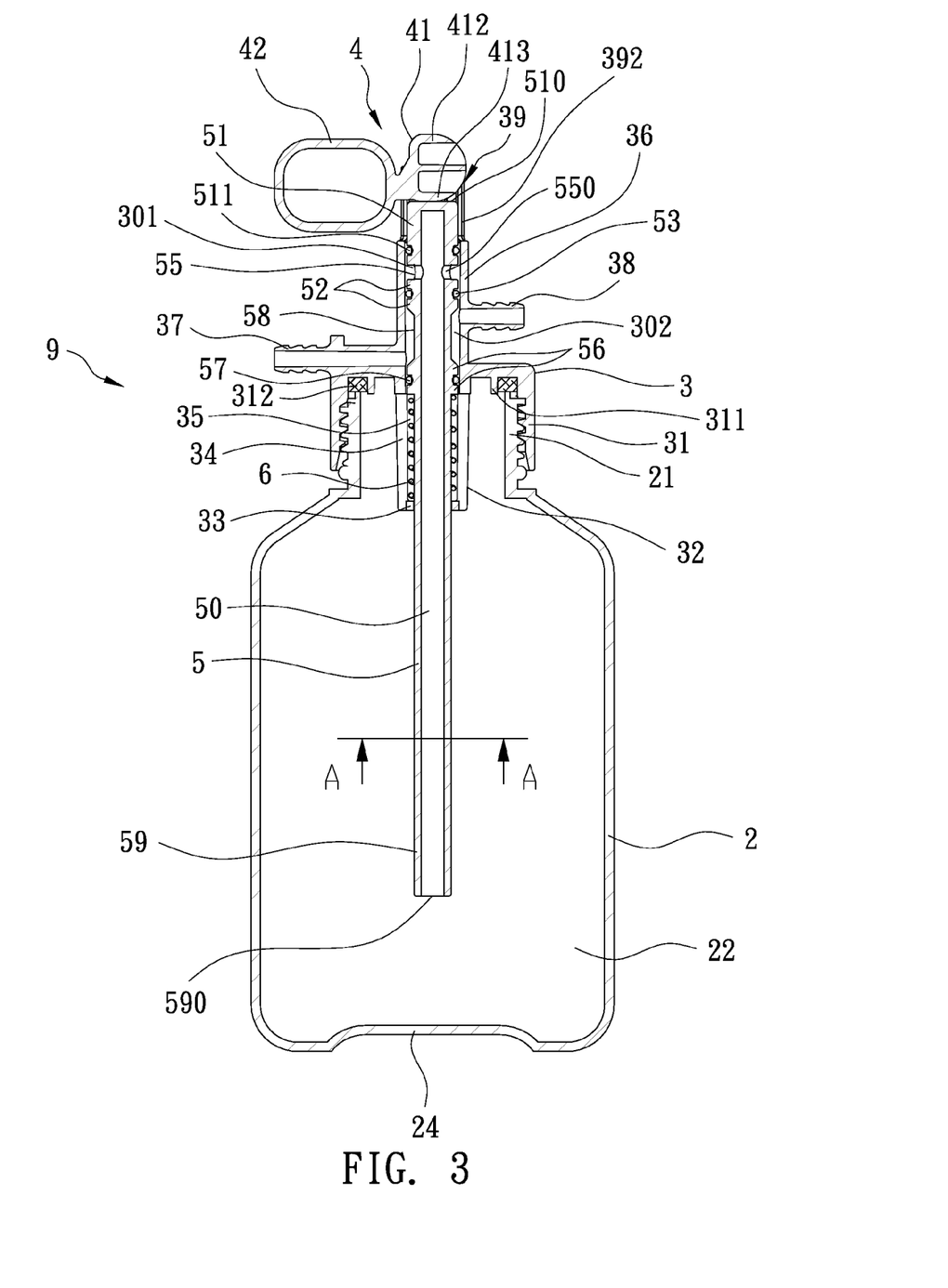
FIG. 3 is a cross-sectional schematic view showing a tire fixing aerosol used in the present invention.
Figure 4:
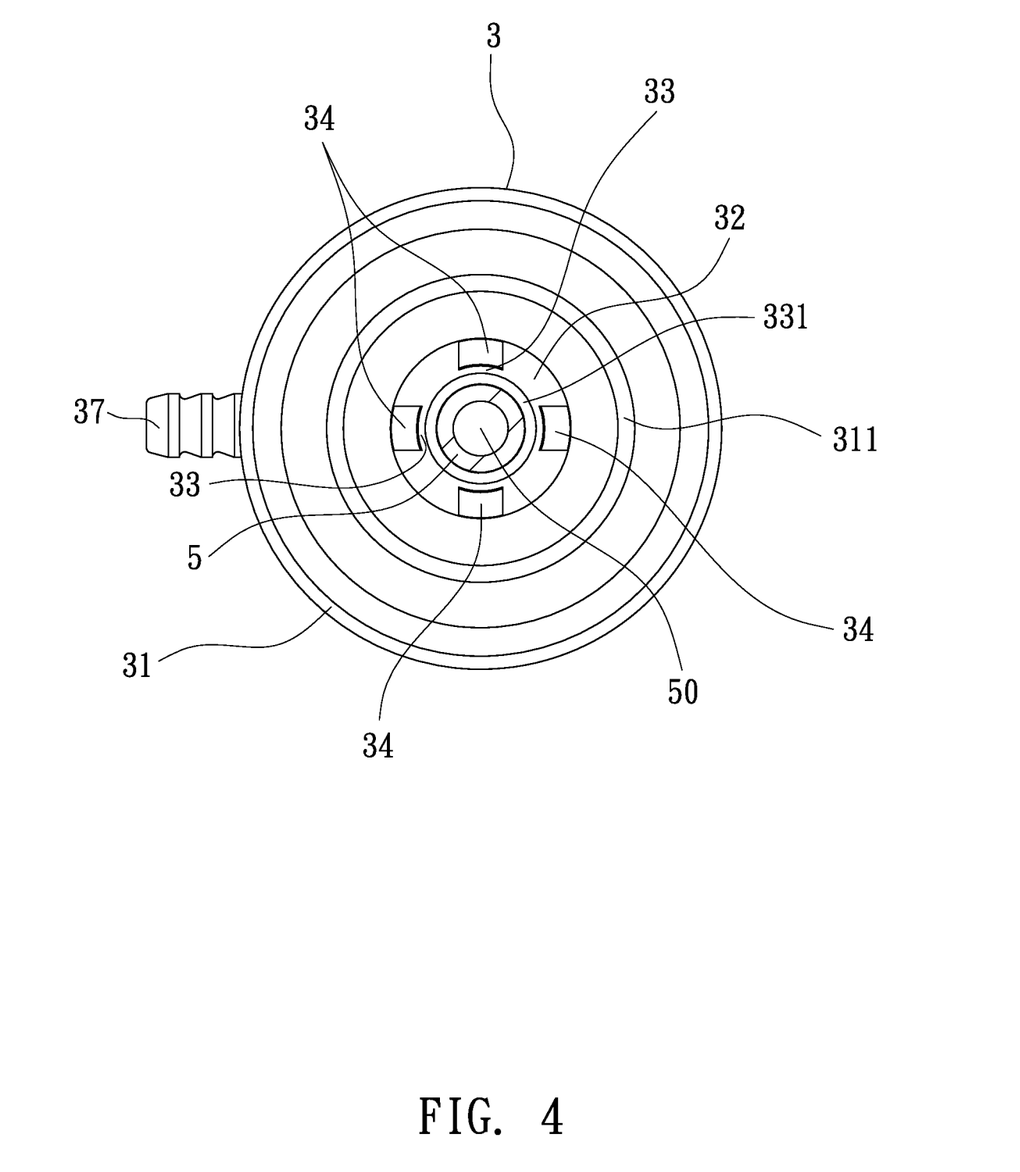
FIG. 4 is a top planar schematic view sectioned from line A-A direction in previous FIG. 3 for a tire fixing aerosol of the present invention.
Figure 5:
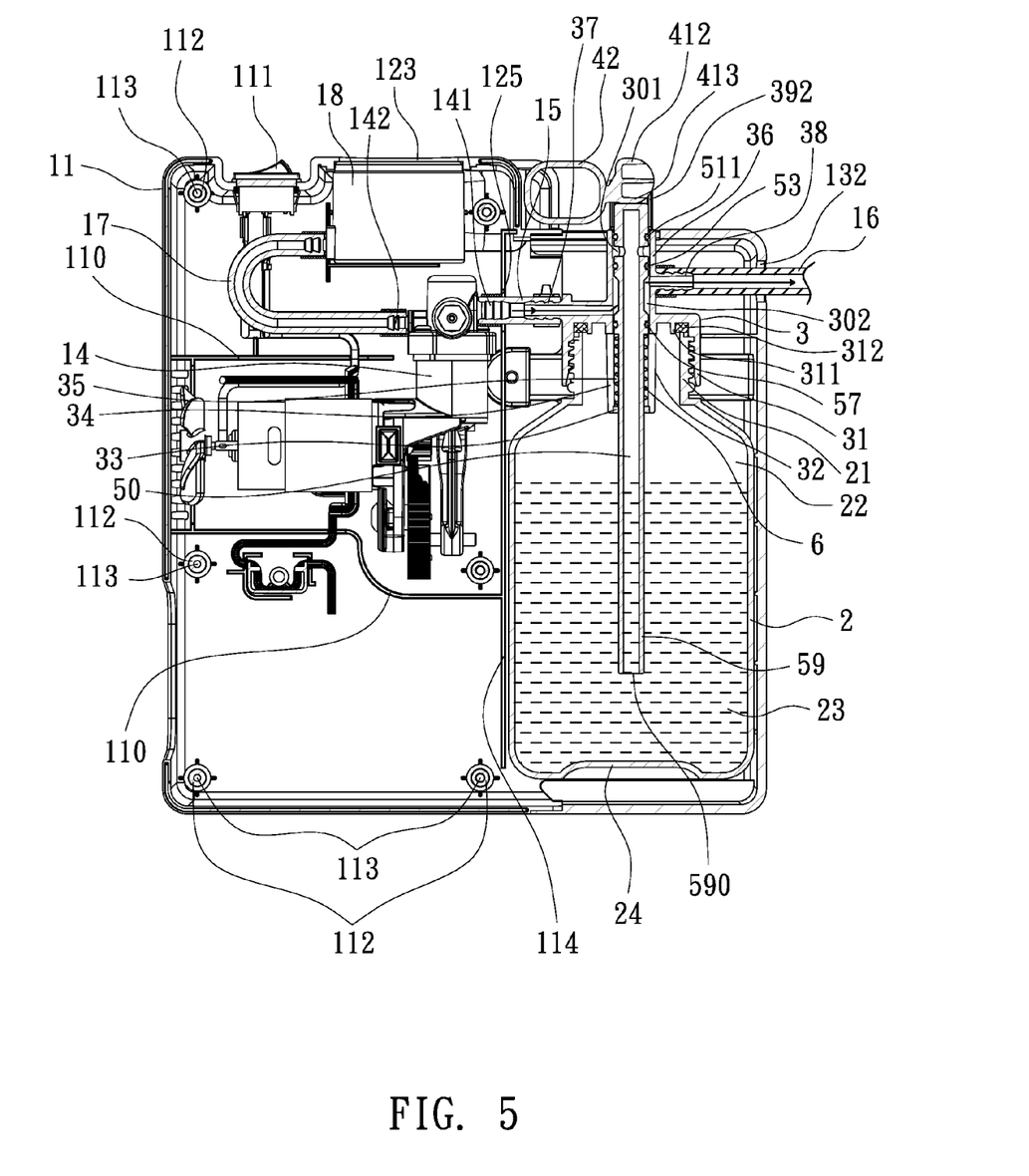
FIG. 5 is an operational cross-sectional schematic view showing for an 1 air compressor singly doing inflating function for a tire of the present invention.
Figure 6:
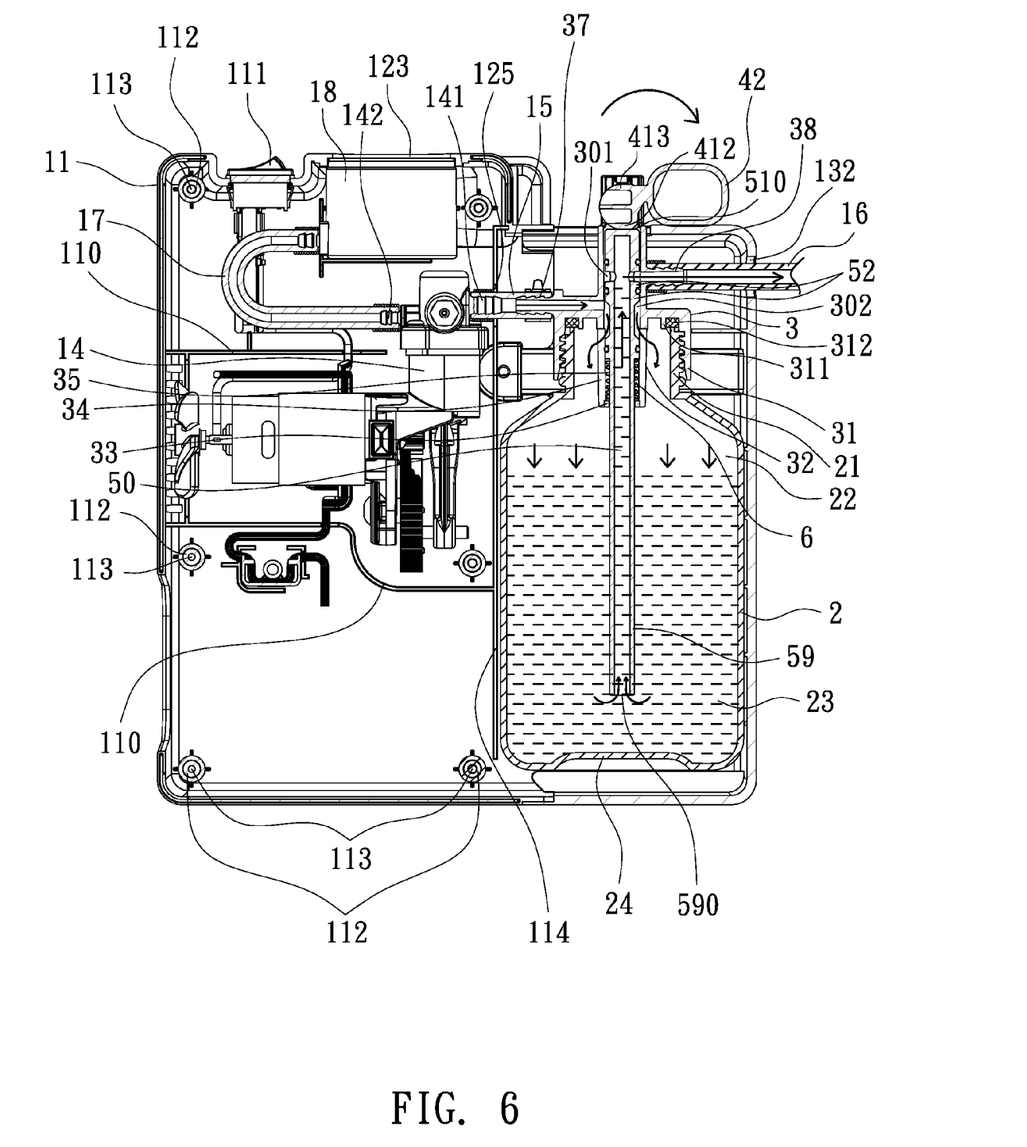
FIG. 6 is an operational cross-sectional schematic view showing for an 1 air compressor singly doing aerosol spraying function for a tire of the present invention.

Please refer to FIGS. 3 through 6. The tire fixing aerosol 9 basically comprises a canister 2, a cover 3, an actuator 4 and a dip tube 5 with deformed upper tubular section, wherein the canister 2, which is a hollow container, includes a neck opening 21, a canister arcuate bottom 24 and a holding chamber 22 for containing chemical sol 23 therein (as shown in FIGS. 5 and 6);

The cover 3 includes a locking collar 31 for engagement with the neck opening 21 of the canister 2 by thread-screwing, which can be done by any suitable fastening means including thread-screwing way or thermal fusing way.

The cover 3 further includes an upper annular gap 301 and a lower annular gap 302, wherein on the bottom wall of the cover 3, an internal annular curb 311 is disposed between the peripheral of the lower round cylinder 32 and the locking collar 31 of the cover 3 while an annular gasket or washer 312 is disposed between the internal annular curb 311 and the locking collar 31 so that the neck opening 21 thread-screwed by the cover 3 and canister 2 becomes more stable and hermetical. The cover 3 further includes a plurality of equal-spaced vertical through trough 34 formed on the surrounding wall of the lower round cylinder 32, and a bottom flange 33 formed at the bottom of the lower round cylinder 32 to define a round hole 331 in communication with an internal circulating chamber 35 of the lower round cylinder 32 (as shown in FIG. 4). The cover 3 further includes an aperture 39 on the top end thereof with a pair of opposed through slots 392 and a pair of opposed axle holes 391, wherein each through slot 392 is formed with its top opening and its bottom closed, and the pair axle holes 391 are located between the pair of through slots 392. The upper round cylinder 36 includes a first manifold 37 and a second manifold 38 to communicate with the internal circulating chamber 35. The cover 3 further includes a spring 6, which is inserted from the aperture 39 of the upper round cylinder 36 and positioned on the bottom flange 33 in the internal circulating chamber 35 of the lower round cylinder 32.

The dip tube 5 of a suitable length includes a tubular inner-space 50, a swollen top collar section 51 with a top closed end 510, a sealing O-ring 511 disposed on the top collar section 51, and a tube lower section 59. The dip tube 5 further includes a middle notched upper flange 52 with a sealing O-ring 53 wrapping on the middle notch thereof, a middle notched lower flange 56 with a sealing O-ring 57 wrapping on the middle notch thereof and a first annular neck groove 55 with a tube through hole 550 disposed between the middle notched upper flange 52 and middle notched lower flange 56 such that the tube through hole 550 run through the dip tube 5 at the first annular neck groove 55 in communicable manner. The dip tube 5 further includes a second annular neck groove 58 formed between the middle notched upper flange 52 and middle notched lower flange 56.

The tube lower section 59 of the dip tube 5 can be inserted through the aperture 39 of the upper round cylinder 36 and run out from the round hole 331 of the bottom flange 33. In this manner, the middle notched lower flange 56 of the dip tube 5 just contact against top end of the spring 6 and located between the lower round cylinder 32 and upper round cylinder 36 in the cover 3. Moreover, a pair of movable upper annular gap 301 and lower annular gap 302 are created between the first annular neck groove 55 and second annular neck groove 58 as well as the lower round cylinder 32 and upper round cylinder 36 respectively.

The actuator 4 includes an eccentric cam 41 with a pair of camshafts 411 on both sides thereof, and a lever ring 42 on the other end of the actuator 4, wherein the pair of camshafts 411 are engaged with the pair of axle holes 391 to allow the actuator 4 pivot around, and the camshaft 411 serves as a pivotal center of the lever ring 42 while the eccentric cam 41 may be located on the aperture 39 of the upper round cylinder 36 to contact against the top closed end 510 of the dip tube 5. The pair of through slot 392 of the upper round cylinder 36 allows a user to control the actuator 4 in a semicircular swing for changing the operation mode.

After having assembled the canister 2 and cover 3, which is combination of the actuator 4, dip tube 5 and spring 6, the lower round cylinder 32 of the cover 3, most portion of the dip tube 5 covering the middle notched lower flange 56 and tube lower section 59 are all contained in the holding chamber 22 of the canister 2 (as shown in FIG. 3).

Please refer to FIGS. 1 and 5. FIG. 5 is an operational cross-sectional schematic view showing an air compressor inflating a tire having the air compressor 14, manometer 18 and tire fixing aerosol 9 contained in the case with combination of compartments 11, 12 and 13. The discharging manifold 142 of the air compressor 14 is connected to the manometer 18 via the third transmitting hose 17. One end of the discharging manifold 141 on the air compressor 14 is connected to the first transmitting hose 15 while the other end thereof is connected to the first manifold 37 of the tire fixing aerosol 9 in the third compartment 13 via the punched holes 125. The upper round cylinder 36 of the tire fixing aerosol 9 can be latched with the cut-out 133 of the third compartment 13. The second manifold 38 of the tire fixing aerosol 9 is connected to the second transmitting hose 16, which can be folded and stored in the internal recess 121, 131 via running through the punched holes 132.

Please refer to FIGS. 5 and 6. FIG. 5 is an operational cross-sectional schematic view showing an air compressor of the present invention singly doing inflating function for a tire while FIG. 6 is an operational cross-sectional schematic view showing an air compressor spraying aerosol spraying function for a tire. The short radial or cam minor axis 413 of the eccentric cam 41 in the actuator 4 contacts against the top closed end 510 of the dip tube 5 (as shown in FIG. 3). In this manner, the spring 6 is released, the compressed air not only reaches the upper round cylinder 36 of the cover 3 orderly via the first transmitting hose 15 and first manifold 37, but also reaches the lower annular gap 302 in the second annular neck groove 58 of the dip tube 5 so that the first manifold 37 and second manifold 38 become communicable. Thereby, the compressed air out of the second manifold 38 can inflate the flat tire dispensing with its another function of repairing rupture tires (as shown in FIG. 5).

For performing both the functions of fixing and inflating the rupture tire, the user can swing the lever ring 42 of the actuator 4 as indicated by the arrowhead in the FIG. 6 so that the long radial or cam major axis 412 instead of cam minor axis 413 of the eccentric cam 41 in the actuator 4 contacts against the top closed end 510 of the dip tube 5 (as shown in FIG. 6). In this manner, the dip tube 5 is pushed downwardly due to the spring 6 is in compressed manner so that the middle notched upper flange 52 of the dip tube 5 will blocks the communication between the first manifold 37 and second manifold 38. Therefore, the compressed air, which reaches the upper round cylinder 36 of the cover 3 orderly via the first transmitting hose 15 and first manifold 37, can not come out of the second manifold 38. Instead, the compressed air flows into the holding chamber 22 of the canister 2 orderly via the lower annular gap 302 between the second annular neck groove 58 and upper round cylinder 36, and the vertical through trough 34 of the lower round cylinder 32. Thereby, the compressed air impels the chemical sol 23 in the canister 2 into the dip tube 5 via the lower tube opening 590 of the tube lower section 59 to rapidly float up so that the chemical sol 23 can be expelled out the second transmitting hose 16 for performing fixing function for the rupture tire orderly via the first annular neck groove 55, tube through hole 550, upper annular gap 301 and second manifold 38.

With foregoing technology disclosed in association with the FIGS. 5 and 6, the actuator 4 together with the tire fixing aerosol 9 contained in the case, the present invention can perform the function of inflating the flat tire, with or without fixing a rupture, if any, in the tire.

In conclusion, the eccentric cam 41 in the actuator 4 enables shift between the operation of the air compressor 14 and tire fixing aerosol 9 in inflating a tire conveniently, with or without repairing a rupture in the tire, if any.

What is claimed is:

1. An air compressor apparatus for inflating a tire and spraying aerosol onto the tire, comprising
   a case, including an air compressor (14), which supplies compressed air;
   a tire fixing aerosol (9) containing chemical sol (23), including an upper round cylinder (36) with a first manifold (37) receiving the compressed air from the air compressor (14), and a second manifold (38) supplying the tire fixing aerosol (9) with the chemical sol (23); and
   an actuator (4), which operates the air compressor (14) to inflate the tire, with or without spraying aerosol onto the tire, including an eccentric cam (41), disposed on the upper round cylinder (36) for controlling the actuator (4) to swing in a semicircular motion, and a lever ring (42)
   wherein said case further comprises a first compartment (11), a second compartment (12) and a third compartment (13), and
      said first compartment (11) includes a plurality of septa (110), a switch (111) and a plurality of engagement shafts (112) including an engagement bore (113) therein such that the air compressor (14) and a manometer (18) are respectively partitioned by each septum (110); the switch (111) is disposed at the top surface of the first compartment (11) for serving to start and stop operation of the air compressor (14);
      said second compartment (12) which is combined with the first compartment (11) by running a plurality of locking elements (7) through a plurality of through bores (122) thereon and corresponding engagement bores (113) in the engagement shafts (112) of the first compartment (11), includes
         a serpent-curled internal recess (121) in front panel,
         a semicircular punched hole (123) for accommodating the manometer (18) in exposed manner, and
         a lateral panel (124) with a protrude panel (126) vertically extended from abutting edge to match with corresponding lateral panel (114) with a protrude panel (115) in the first compartment (11); and
      said third compartment (13) includes an encompassed space (130), an internal recess (131) with a punched hole (132), a cut-out (133) defined on the top surface thereof, and a pair of latches (134) formed on both side walls for engagement with the protrude panel (115), and the protrude panel (126) on the first compartment (11) and second compartment (12), respectively.

2. The air compressor apparatus as recited and claimed in claim 1, wherein said tire fixing aerosol (9) is firmly disposed in the encompassed space (130) of the third compartment (13) in contact with the lateral panel (114), and the lateral panel (124) on the first compartment (11) and second compartment (12), respectively without tilting or tumbling.

3. The air compressor apparatus as recited and claimed in claim 2, wherein said tire fixing aerosol (9) comprises a canister (2), a cover (3), an actuator (4) and a dip tube (5) with deformed upper tubular section, wherein the canister (2), which is a hollow container, includes a neck opening (21), a canister arcuate bottom (24) and a holding chamber (22) for containing chemical sol (23) therein; said cover (3) includes a locking collar (31) for engaging the neck opening (21) of the canister (2) by thread-screwing; said cover (3) further includes an upper annular gap (301) and a lower annular gap (302), wherein on the bottom wall of the cover (3), an internal annular curb (311) is disposed between the peripheral of a lower round cylinder (32) and the locking collar (31) of the cover (3) while an annular gasket or washer (312) is disposed between the internal annular curb (311) and the locking collar (31); the cover (3) further includes a plurality of equally spaced vertical through troughs (34) formed on a surrounding wall of the lower round cylinder (32), and a bottom flange (33) formed at the bottom of the lower round cylinder (32), to define a round hole (331) in communication with an internal circulating chamber (35) of the lower round cylinder (32); the cover (3) further includes an aperture (39) on the top end thereof with a pair of opposed through slots (392) and a pair of opposed axle holes (391), wherein each through slot (392) opens at top and closes at bottom, and the pair of axle holes (391) are located between the pair of through slots (392); the upper round cylinder (36) includes a first manifold (37) and a second manifold (38) to communicate with the internal circulating chamber (35); the cover (3) further includes a spring (6), which is inserted from the aperture (39) of the upper round cylinder (36) and positioned on the bottom flange (33) in the internal circulating chamber (35) of the lower round cylinder (32); said dip tube (5) of suitable length includes a tubular inner-space (50), a swollen top collar section (51) with a top closed end (510), a sealing O-ring (511) disposed on the top collar section (51), and a tube lower section (59); the dip tube (5) further includes a middle notched upper flange (52) with a sealing O-ring (53) wrapping on the middle notch thereof, a middle notched lower flange (56) with a sealing O-ring (57) wrapping on the middle notch thereof and a first annular neck groove (55) with a tube through hole (550) disposed between the middle notched upper flange (52) and middle notched lower flange (56) such that the tube through hole (550) runs through the dip tube (5) at the first annular neck groove (55); the dip tube (5) further includes a second annular neck groove (58) formed between the middle notched upper flange (52) and middle notched lower flange (56); and said tube lower section (59) of the dip tube (5) is inserted through the aperture (39) of the upper round cylinder (36) and run out from the round hole (331) of the bottom flange (33); in this manner, the middle notched lower flange (56) of the dip tube (5) just contacts against top end of the spring (6) and located between the lower round cylinder (32) and upper round cylinder (36) in the cover (3); the movable upper annular gap (301) and the lower annular gap (302) are defined between the first annular neck groove (55) and second annular neck groove (58) as well as the lower round cylinder (32) and upper round cylinder (36), respectively.

4. The air compressor apparatus as recited and claimed in claim 3, wherein only one second transmitting hose (16) is exposed out of said case.

5. The air compressor apparatus as recited and claimed in claim 3, wherein said actuator (4) includes an eccentric cam (41) with a pair of camshafts (411) on both sides thereof, and a lever ring (42) on the other end of the actuator (4), and the pair of camshafts (411) are engaged with the pair of axle holes (391) to allow the actuator (4) pivot around, and the pair of camshafts (411) serve as a pivotal center of the lever ring (42) while the eccentric cam (41) is located on the aperture (39) of the upper round cylinder (36) to contact against the top closed end (510) of the dip tube (5), and said pair of through slots (392) of the upper round cylinder (36) to control the actuator (4) to swing in a semicircular motion in changing a mode of operation.

* * * * *